US008486581B2

(12) United States Patent
Wang et al.

(10) Patent No.: US 8,486,581 B2
(45) Date of Patent: Jul. 16, 2013

(54) FUEL CARTRIDGE, FUEL CELL SYSTEM, AND POWER MANAGEMENT METHOD THEREOF

(75) Inventors: Cheng Wang, Hsinchu County (TW);
Nien-Hui Hsu, Hsinchu County (TW);
Po-Kuei Chou, Hsinchu County (TW)

(73) Assignee: Young Green Energy Co., Hsinchu County (TW)

( * ) Notice: Subject to any disclaimer, the term of this patent is extended or adjusted under 35 U.S.C. 154(b) by 245 days.

(21) Appl. No.: 12/957,414

(22) Filed: Dec. 1, 2010

(65) Prior Publication Data

US 2011/0135973 A1 Jun. 9, 2011

(30) Foreign Application Priority Data

Dec. 4, 2009 (CN) .......................... 2009 1 0253652

(51) Int. Cl.
*H01M 8/02* (2006.01)
*H01M 8/06* (2006.01)
*H01M 8/04* (2006.01)

(52) U.S. Cl.
USPC ........................................................ 429/515

(58) Field of Classification Search
USPC ........................................................ 429/515
See application file for complete search history.

(56) References Cited

U.S. PATENT DOCUMENTS

| 4,302,217 | A | * | 11/1981 | Teitel ............................ 48/189.2 |
| 5,817,157 | A | * | 10/1998 | Checketts ......................... 48/61 |
| 6,592,741 | B2 | * | 7/2003 | Nakanishi et al. ............. 205/343 |
| 6,790,416 | B2 | | 9/2004 | Mann et al. |
| 7,282,073 | B2 | * | 10/2007 | Petillo et al. ...................... 48/61 |
| 7,487,858 | B2 | | 2/2009 | Kawahashi et al. |
| 2007/0253875 | A1 | * | 11/2007 | Koripella et al. ............. 422/232 |
| 2008/0274384 | A1 | * | 11/2008 | Finkelshtain et al. .......... 429/19 |

FOREIGN PATENT DOCUMENTS

| CN | 1518151 | 8/2004 |
| CN | 1981403 | 6/2007 |
| CN | 101432912 | 5/2009 |
| WO | 2007098109 | 8/2007 |

OTHER PUBLICATIONS

"First Office Action of China counterpart application with English translation" issued on Aug. 14, 2012, p1-p9.
"Second Office Action of China Counterpart Application", issued on Apr. 2, 2013, p. 1-p. 6, in which the listed reference was cited.

* cited by examiner

*Primary Examiner* — Gregg Cantelmo
(74) *Attorney, Agent, or Firm* — Jianq Chyun IP Office

(57) ABSTRACT

A fuel cartridge includes a plurality of chambers and a plurality of supply devices. Each of the chambers is capable of storing a first reactant. The supply devices are respectively corresponding to the chambers; and each of the supply devices is capable of supplying a second reactant to the corresponding chamber so that the second reactant reacts with the first reactant in the corresponding chamber to generate hydrogen gas. In addition, a fuel cell system using the fuel cartridge and a power management method thereof are also provided.

6 Claims, 9 Drawing Sheets

FUEL CARTRIDGE, FUEL CELL SYSTEM, AND POWER MANAGEMENT METHOD THEREOF

CROSS-REFERENCE TO RELATED APPLICATION

This application claims the priority benefit of China application serial no. 200910253652.5, filed on Dec. 4, 2009. The entirety of the above-mentioned patent application is hereby incorporated by reference herein and made a part of this specification.

BACKGROUND OF THE INVENTION

1. Field of the Invention

The invention relates to an energy technology, and more particularly, to a fuel cartridge, a fuel cell system using the fuel cartridge, and a power management method thereof.

2. Description of the Related Art

The development and application of energy are always indispensable conditions for the human lives. However, destroy of environment is growing up with the development and application of energy. The energy produced by means of the fuel cell technology is advantageous in high efficiency, low noise, and pollution-free. Therefore, the fuel cell becomes an energy mean meeting the modern time trend.

The current fuel cell system roughly includes three major portions, which are a fuel cartridge, a fuel cell, and a secondary battery. The fuel cartridge is used for providing the hydrogen gas to make the fuel cell generates the electric-power. The secondary battery is used for receiving the electric-power generated by the fuel cell to perform charging, and supplying the electric-power to the electronic device accordingly.

Generally speaking, the traditional fuel cartridge mostly adopts the hydrogen-storage technology of the boron group compound with the disposable reaction, and continuously generates the hydrogen gas (H2) to the fuel cell by adding water to generate the chemical reaction. However, since the design of the traditional fuel cartridge is a large-sized chamber, and the chemical reaction generated by the hydrogen-storage technology of the boron group compound applied in such fuel cartridge is the disposable reaction, the hydrogen gas would be continuously generated until the chemical reaction of the fuel of NaBH4 and water (H2O) reacts completely.

From the above, even though the electric quantity of the secondary battery is not consumed by the electronic device, the fuel cartridge still continuously provides the hydrogen gas to the fuel cell, such that the hydrogen gas and the electric-power would be wasted, and thus the hydrogen gas provided by the fuel cartridge could not be fully utilized.

Additionally, U.S. Pat. Nos. 6,790,416 and 7,487,858 also disclose the techniques relating to the fuel cell.

SUMMARY OF THE INVENTION

Accordingly, the invention is directed to a fuel cartridge and a fuel cell system using the fuel cartridge and a power management method thereof. The utilization of the hydrogen gas generated by the fuel cartridge and used by the fuel cell could be increased.

Additional aspects and advantages of the invention will be set forth in part in following description.

To achieve at least one of aforementioned or other advantages, one embodiment of the invention provides a fuel cartridge including a plurality of chambers and a plurality of supply devices. Each of the chambers is capable of storing a first reactant. The supply devices are respectively corresponding to the chambers; and each of the supply devices is capable of supplying a second reactant to the corresponding chamber so that the second reactant reacts with the first reactant in the corresponding chamber to generate hydrogen gas.

In another embodiment of the invention provides a fuel cell system including the above fuel cartridge, a fuel cell, and a secondary battery. The fuel cell is coupled to the fuel cartridge and capable of absorbing the hydrogen gas from the fuel cartridge, so as to generate an electric-power. The secondary battery is electrically connected to the fuel cell, and capable of receiving the electric-power for charging.

In one embodiment of the invention, at least one of the first reactant and the second reactant includes a chemical hydride.

In one embodiment of the invention, at least one of the first reactant and the second reactant includes a hydrogen-containing compound.

In another embodiment of the invention, the first reactant includes a hydrogen-containing compound, and the second reactant includes a chemical hydride.

In one embodiment of the invention, each of the supply devices at least includes a manual switch, a magnetic device, a linkage device or a gear device driven by a motor.

In one embodiment of the invention, the number of the chambers is X; a capacitance of the secondary battery is N watt-hour; and when the fuel cell generates the electric-power by absorbing the hydrogen gas generated from one of the chambers in the fuel cartridge, an electric quantity of the electric-power is N/X watt-hour.

In one embodiment of the invention, when the secondary battery consumes N/X watt-hour electric quantity, another one of the supply devices supplies the second reactant to the corresponding chamber to make the second reactant and the first reactant in the corresponding chamber react to generate hydrogen gas.

In one embodiment of the invention, the fuel cell is capable of absorbing the hydrogen gas generated from one of the chambers in the fuel cartridge to generate the electric-power and supply the electric-power to the secondary battery.

In further embodiment of the invention provides a power management method adapted to the above fuel cell system. The power management method includes providing the above fuel cell system; detecting whether an amount of an electric-power supplied from the secondary battery to an electronic device is reached to a predetermined value; and when the amount of the electric-power supplied from the secondary battery to the electronic device is reached to the predetermined value, controlling the fuel cartridge to make one of the supply devices supply the second reactant to the corresponding chamber so that the second reactant reacts with the first reactant in the corresponding chamber to generate hydrogen gas.

In one embodiment of the invention, the power management method further includes when the amount of the electric-power supplied from the secondary battery to the electronic device is not reached to the predetermined value, controlling the secondary battery to continuously supply the electric-power to the electronic device.

In one embodiment of the invention, the power management method further includes detecting the reaction state of each of the chambers and the corresponding supply device; and when the reaction state of each of the chambers and the corresponding supply device is determined to react completely, setting the electronic device to send out a warning signal (for example, message, the change of light, . . . etc.), so as to remind user to replace the fuel cartridge or to remind user that the fuel cartridge could not generate enough hydrogen gas.

From the above, the above embodiments of the invention have at least one of following advantages. In the above embodiments of the invention, since the fuel cartridge has a plurality of chambers, and when the amount of the electric-power supplied from the secondary battery and provided to the electronic device reaches to the predetermined value of N/X watt-hour for example, one of the chambers is utilized to generate the hydrogen gas to provide to the fuel cell, namely, the fuel cartridge sectionally provides the hydrogen gas to the fuel cell rather than entirely provides the hydrogen gas at once. Accordingly, the hydrogen gas generated by each of the chambers in the fuel cartridge could be utilized fully by the fuel cell without wasting any hydrogen gas.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
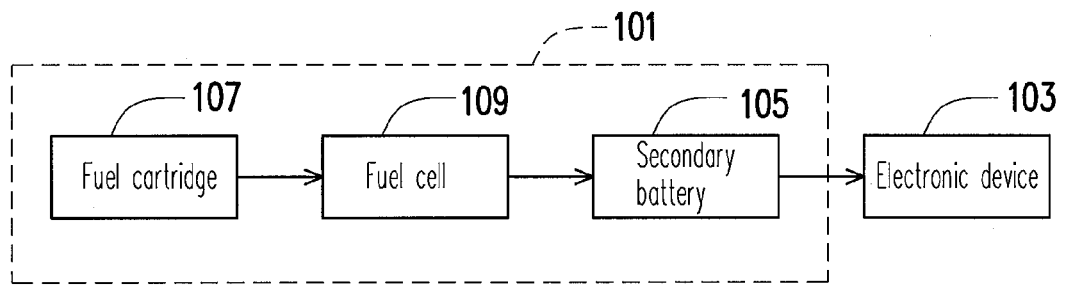
FIG. 1 is an application diagram of a fuel cell system according to one embodiment of the invention.

FIG. 1 is an application diagram of a fuel cell system according to one embodiment of the invention. Referring to FIG. 1, the fuel cell system 101 is used for supplying electric-power to the electronic device 103, and the fuel cell system 101 includes a secondary battery 105, a fuel cartridge 107, and a fuel cell 109. In the embodiment, the secondary battery 105 is used for receiving the electric-power generated by the fuel cell 109 for charging, and supplies the electric-power to the electronic device 103 accordingly. The fuel cartridge 107 is capable of generating the suitable hydrogen gas to the fuel cell 109 according to the amount of the electric-power supplied from the secondary battery to the electronic device 103.

The fuel cell 109 is coupled to the fuel cartridge 107, and electrically connected to the secondary batter 105 and the electronic device 103. The fuel cell 109 is used for absorbing the hydrogen gas generated by the fuel cartridge 107 so as to generate the electric-power to the secondary battery 105.

In the embodiment, the fuel cell 109 may be a proton exchange membrane fuel cell (PEMFC) or a direct methanol fuel cell (DMFC), but not limited thereto. For example, the PEMFC is mainly constituted by the proton exchange membrane and two electrodes of anode and cathode. The fuel and the catalyst of the anode react to generate the hydrogen ions and the electrons, which chemical formula may represent as below:

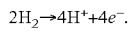

$$2H_2 \rightarrow 4H^+ + 4e^-.$$

In addition, the electrons generated at the anode would go to the cathode. The hydrogen ions generated by the reaction at the anode would go to the cathode through the proton exchange membrane and then react with the electrons and oxygen to generate water, which chemical formula may represent as below:

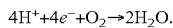

$$4H^+ + 4e^- + O_2 \rightarrow 2H_2O.$$

Therefore, the overall chemical reaction formula of the PEMFC may represent as below:

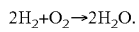

$$2H_2 + O_2 \rightarrow 2H_2O.$$

However, how the fuel cell generates the electric-power is the skill known by one person having skill in the art, so this would be omitted to describe herein.

Figure 2:
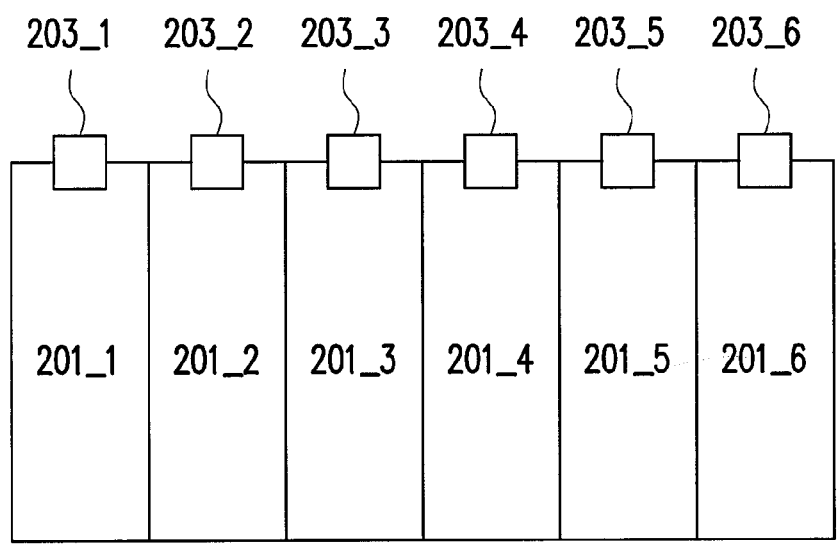
FIG. 2 is a diagram of a fuel cartridge according to one embodiment of the invention.
Figure 3A:
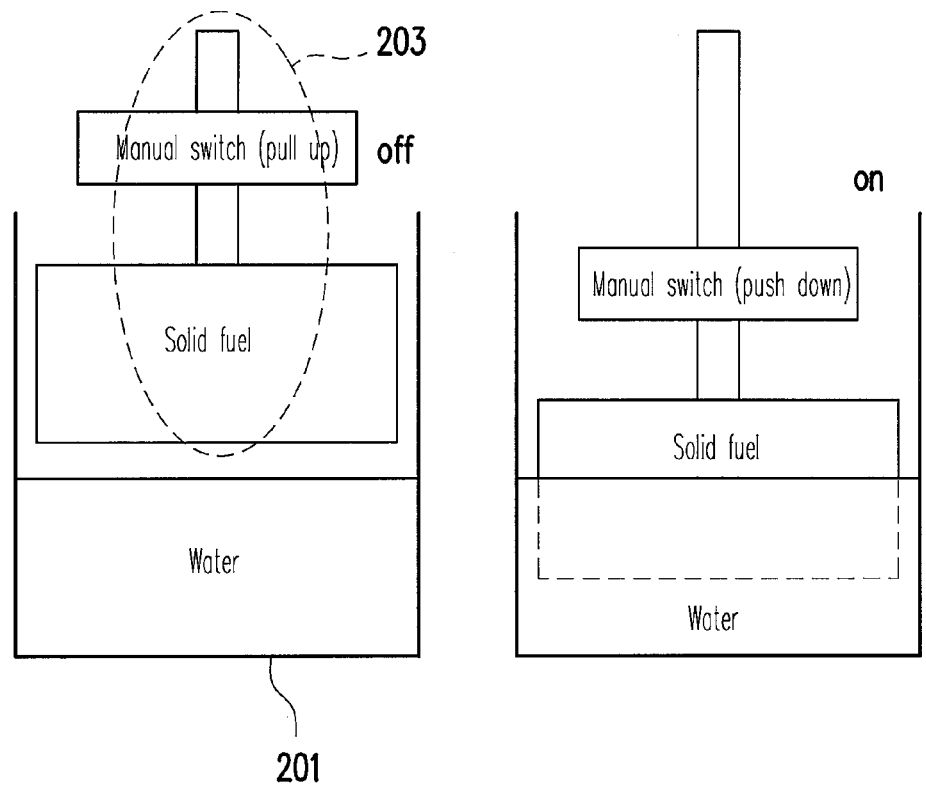
FIG. 3A is a diagram of a supply device with a manual switch according to one embodiment of the invention.
Figure 3B:
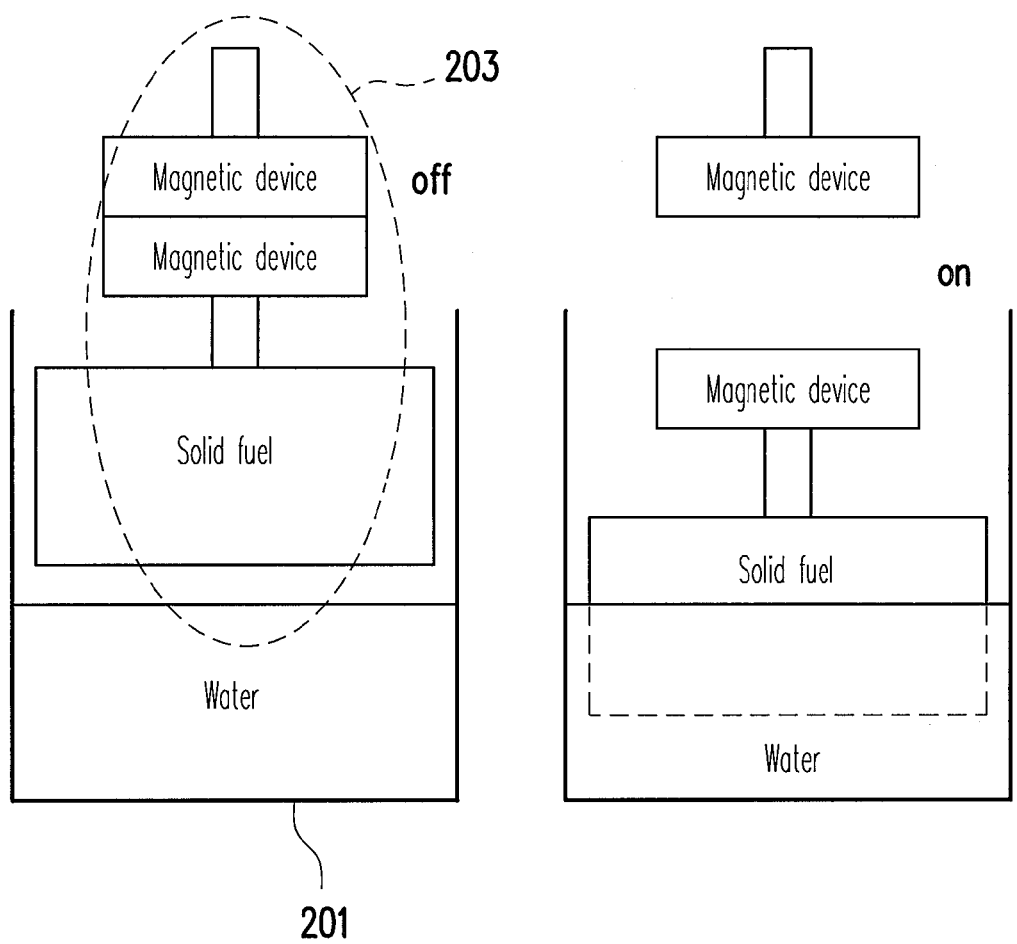
FIG. 3B is a diagram of a supply device with a magnetic device according to one embodiment of the invention.
Figure 3C:
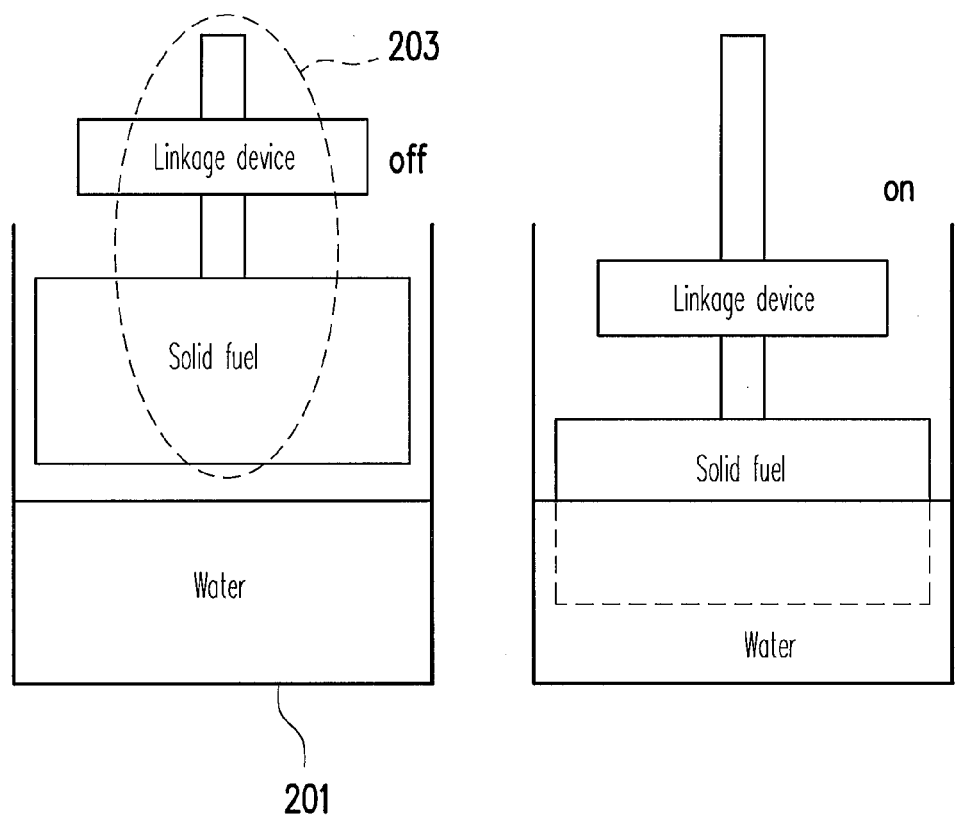
FIG. 3C is a diagram of a supply device with a linkage device according to one embodiment of the invention.
Figure 3D:
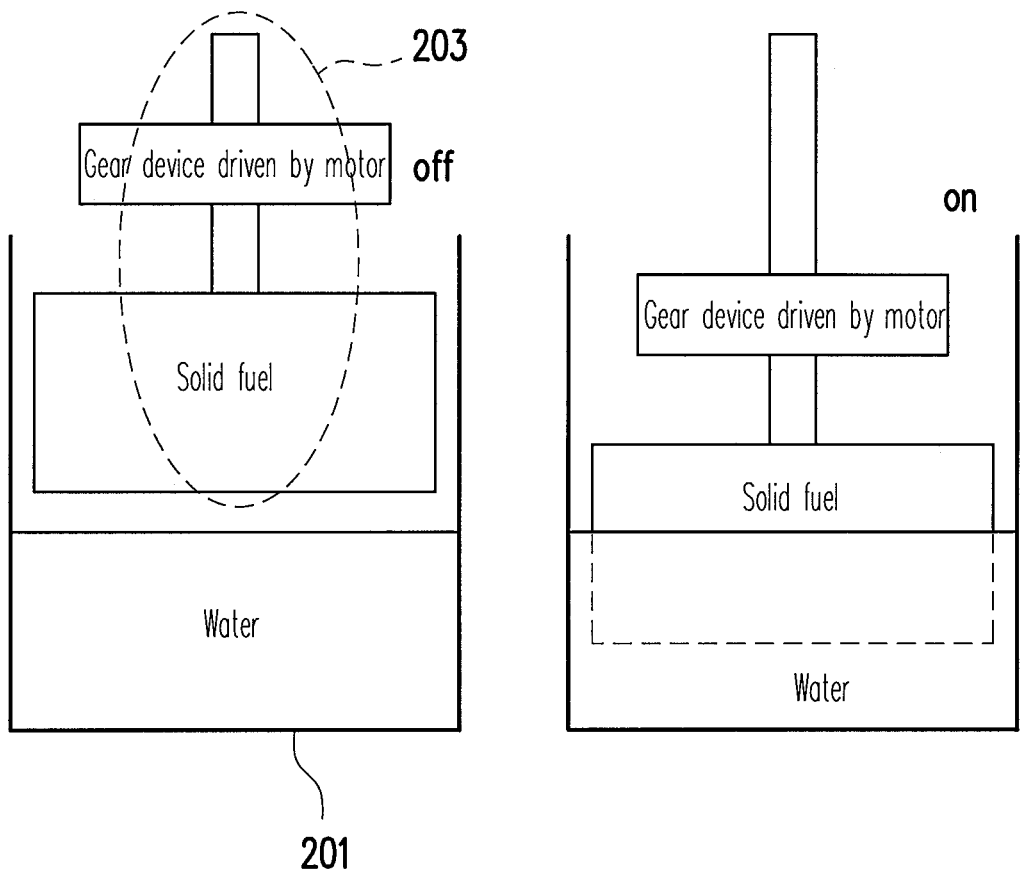
FIG. 3D is a diagram of a supply device with a gear device driven by a motor according to one embodiment of the invention.
Figure 4:
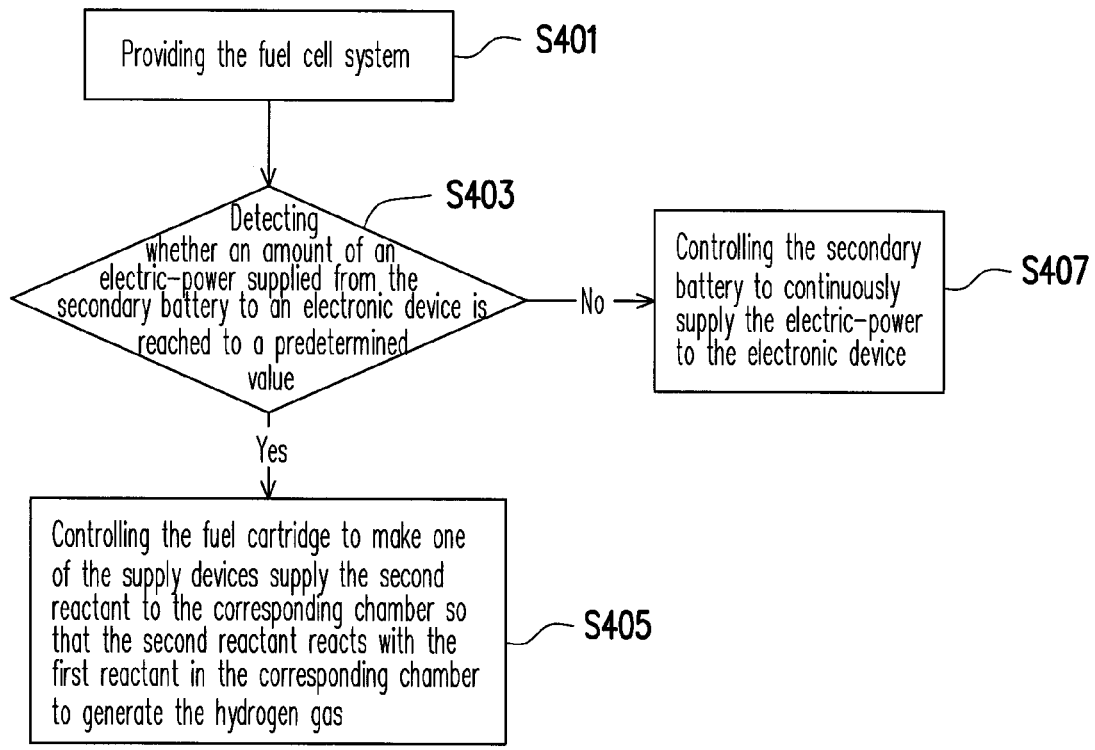
FIGS. 4 through 7 are a flow chart of a power management method according to one embodiment of the invention.
Figure 5:
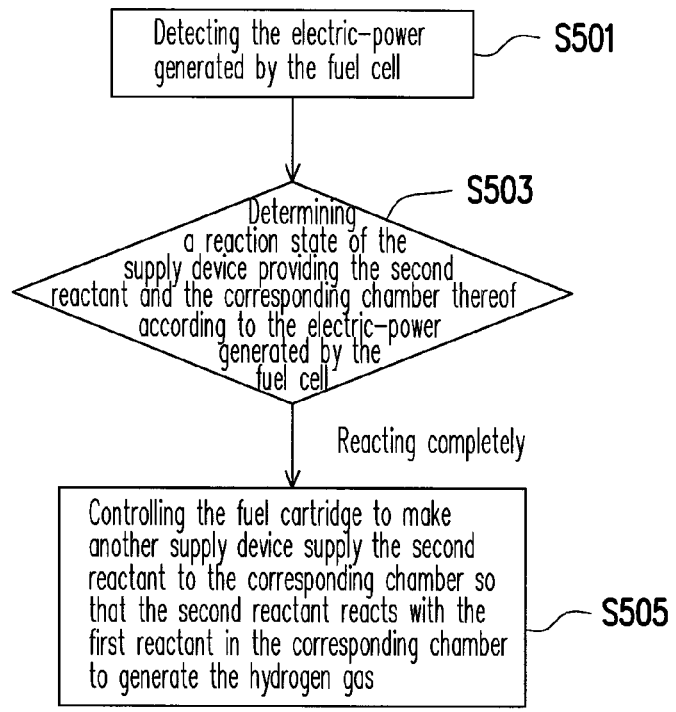
Figure 6:
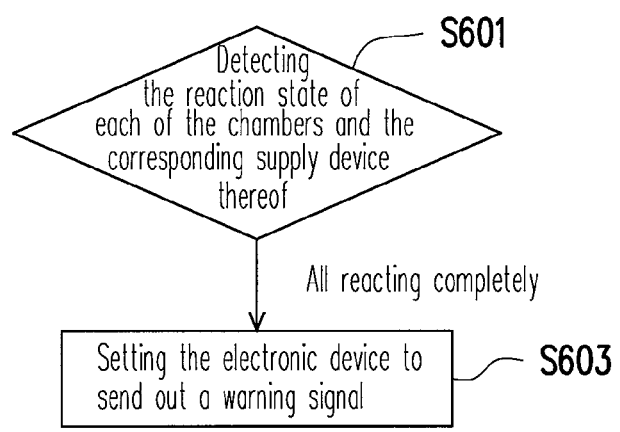

To be specific, FIG. 2 is a diagram of a fuel cartridge according to one embodiment of the invention. Referring to FIGS. 1 and 2, the fuel cartridge 107 includes a plurality of chambers (At least two chambers and six chambers 201_1 through 201_6 are taken for example herein, but not limited thereto.) and a plurality of supply devices (six supply devices 203_1 through 203_6 are taken for example herein, but not limited thereto.). In the embodiment, the chambers 201_1 through 201_6 are respectively corresponding to the supply devices 203_1 through 203_6, namely, the chamber 201_1 is corresponding to the supply device 203_1; the chamber 201_2 is corresponding to the supply device 203_2; and so on. In addition, each of the chambers 201_1 through 201_6 is capable of storing a first reactant, where the first reactant may be any hydrogen-containing compound such as $H_2O$, NaOH ... etc., but not limited thereto.

Moreover, each of the supply devices 203_1 through 203_6 is capable of supplying a second reactant to the corresponding chamber (201_1 through 201_6) so that the second reactant reacts with the first reactant to generate hydrogen gas required by the fuel cell 109 for generating electric-power. The second reactant may be a solid fuel such as any chemical hydride, for example, $NaBH_4$, LiH, etc., but not limited thereto. In addition, each of the supply devices 203_1 through 203_6 may be a mechanism device such as a manual switch, a magnetic device, a linkage device or a gear device driven by a motor, but not limited thereto.

Take a single chamber 201 and a single supply device 203 for example, FIGS. 3A through 3D are respectively a diagram of a supply device 203 adopting the manual switch, the magnetic device, the linkage device, and the gear device driven by the motor according to one embodiment of the invention. Referring to FIGS. 3A through 3D, it could be clearly seen that, in FIGS. 3A through 3D, the supply device 203 may supply the second reactant (i.e. the solid fuel) to the chamber 201 by using the manual switch, the magnetic device, the linkage device, or the gear device driven by the motor.

Accordingly, when the first reactant (for example, water) contacts the second reactant (i.e. "on" shown in FIGS. 3A through 3D), the chemical reaction would be occurred to generate the hydrogen gas to the fuel cell 109. Whereas, when the first reactant does not contact the second reactant (i.e. "off" shown in FIGS. 3A through 3D), the chemical reaction would not be occurred and the hydrogen gas would not be generated for the fuel cell 109 accordingly.

In the embodiment, when the first reactant contacts the second reactant, the chemical reaction formulas are represented as follows:

$$[CH_3N(H)BH_2]3 \rightarrow [CH_3NBH]_3 + 3H_2; \quad 1.$$

$$nNH_4X + 4MH_n \rightarrow Mx_n + M_3N_n + 4nH_2; \quad 2.$$

$$N_2H_6X_2 + 8/nMH_n \rightarrow 2/nMx_n + 2/nM_3N_n + 7H_2; \quad 3.$$

$$(NH_4)_2SO_4 + 16/nMH_n \rightarrow 4M_{2/n}O + M_{2/n}S + 2/nM_3N_n 12H_2; \quad 4.$$

$$N_2H_6SO_4 + 16/nMH_n \rightarrow 4M_{2/n}O + M_{2/n}S + 2/nM_3N_n + 11H_2; \quad 5.$$

$$LiBH_4 \rightarrow LiH + B + (3/2)H_2; \quad 6.$$

$$Ni + 2H_2O \rightarrow Ni(OH)_2 + H_2; \text{ and} \quad 7.$$

$$NaBH_4 + 2H_2O \rightarrow NaBO_2 + 4H_2. \quad 8.$$

However, in another embodiment of the invention, the first reactant and the second reactant may be disposed upside down, such that water could be fixed in hydrogel or absorbed by any water absorbing material such as sponge, absorbing cotton, etc.

As mentioned above, the embodiment may also adopt the hydrogen-storage technology of the boron group compound with the disposable reaction in the fuel cartridge 107 (but not limited thereto, other types of hydrogen-storage technology may also be adopted therein) so as to generate the hydrogen gas to the fuel cell 109. In the embodiment, since the fuel cartridge 107 has six chambers 201_1 through 201_6, when the amount of the electric-power supplied from the secondary battery 105 to the electronic device 103 reaches to the predetermined value (as described clearly in below), one of the supply devices 203_1 through 203_6 would be controlled to supply the second reactant to the corresponding chamber (201_1/201_2/.../201_6), so as to react with the first reactant to generate the hydrogen gas to the fuel cell 109. Accordingly, the hydrogen gas generated by the fuel cartridge 107 could be utilized fully by the fuel cell 109 without wasting any hydrogen gas.

To be specific, the electric quantity of the electric-power generated from the fuel cell 109 by absorbing the hydrogen gas in one of the chambers 201_1 through 201_6 is determined by the number of the chambers 201 and the capacitance of the secondary battery 105. For example, assuming that the capacitance of the secondary battery 105 is N watt-hour, and the number of the chambers 201 is six, such that the electric quantity of the electric-power generated from the fuel cell 109 by absorbing the hydrogen gas in one of the chambers 201_1 through 201_6 is N/X watt-hour. Accordingly, when the secondary battery 105 consumed N/X watt-hour an electric quantity for supplying the electronic device 103, another one of the supply devices 203_1 through 203_6 which does not react would supply the second reactant to the corresponding chamber (201_1 through 201_6) so as to react with the first reactant to generate the hydrogen gas to the fuel cell 109, and thus making the fuel cell 109 generates the electric-power to the secondary battery 105 to replenish the consumed electric quantity of the secondary battery 105.

For example, assuming that the capacitance of the secondary battery 105 and the amount of the electric-power generated from the fuel cell 109 by absorbing all the hydrogen gas in the fuel cartridge 107 are all 60 watt-hour (but not limited thereto), such that when the amount of the electric-power of the secondary battery 105 is 50 watt-hour (i.e. the secondary battery 105 has provided 10 watt-hour to the electronic device 103), it may supply the second reactant to, for example, the chamber 201_1 through the supply device 203_1 at this time. Accordingly, the first reactant would contact the second reactant to cause the chemical reaction and thus generating the hydrogen gas to the fuel cell 109.

At this moment, since the chemical reaction of the first reactant and the second reactant belongs to the disposable reaction, the hydrogen gas would be continuously generated until the chemical reaction of the solid fuel and water reacts completely. Accordingly, the fuel cell 109 would generate the electric-power which is about 10 watt-hour to charge the secondary battery 105, and thus making the amount of the electric-power of the secondary battery 105 restore to 60 watt-hour.

In the other view, once when the amount of the electric-power of the secondary battery 105 is 50 watt-hour again (i.e. the secondary battery 105 has consumed the electric-power of 10 watt-hour by the electronic device 103), it may supply the second reactant to, for example, the chamber 201_2 through the supply device 203_2 at this time. Accordingly, the first reactant would contact the second reactant to cause the chemical reaction and thus generating the hydrogen gas to the fuel cell 109.

At this moment, since the chemical reaction of the first reactant and the second reactant belongs to the disposable reaction, the hydrogen gas would be continuously generated until the chemical reaction of the solid fuel and water reacts completely. Accordingly, the fuel cell 109 would still generate the electric-power which is about 10 watt-hour to charge the secondary battery 105, and thus making the amount of the electric-power of the secondary battery 105 restore to 60 watt-hour again.

From the above, the fuel cartridge 107 may generate the suitable hydrogen gas to the fuel cell 109 many times (six times in the embodiment) at the suitable time (i.e. whenever the electric-power of the secondary battery 105 has consumed 10 watt-hour by the electronic device 103), namely, the embodiment adopts the concept of using the fuel cartridge 107. However, the traditional fuel cartridge would continuously generate the hydrogen gas relative to 60 watt-hour to the fuel cell 109 even though the electronic device 103 does not consume the electric quantity of the secondary battery 105, namely, the conventional art adopts the concept of using the fuel cartridge at once.

Accordingly, the consumed electric quantity of the secondary battery 105 may be equal to the electric quantity of the electric-power used for charging the secondary battery 105 and provided by the fuel cell 109 through the design of the fuel cartridge 107 in the embodiment. Therefore, the hydrogen gas generated by each of the chambers 201_1 through 201_6 in the fuel cartridge 107 could be utilized fully by the fuel cell 109 without wasting any hydrogen gas through the design of the fuel cartridge 107 in the embodiment, but the invention is not limited thereto.

In other words, the embodiment may make the secondary battery 105 in the fuel cell system 101 supply power when the electronic device 103 does not receive power supplied by the city power. Moreover, when the consumed electric quantity of the secondary battery 105 reaches to the electric quantity of the electric-power generated from the fuel cell 109 by absorbing the hydrogen gas generated by reacting the reactants of a single supply device (203_1 through 203_6) and the corresponding chamber (201_1 through 201_6) thereof, one of the un-reacted supply devices 203_1 through 203_6 would supply the second reactant to the corresponding chamber (201_1 through 201_6) so as to make the fuel cell 109 generate the electric-power to charge the secondary battery 105. Accordingly, the endurance of the secondary battery 105 could be increased.

In the above embodiments, the fuel cartridge 107 generates the suitable hydrogen gas to the fuel cell 109 when the secondary battery 105 provides the amount of the electric-power of 10 watt-hour to the electronic device 103. In the other embodiments of the invention, other values greater than or less than 10 watt-hour could be replaced thereto, and are determined by request.

Summarily, FIGS. 4 through 7 are flow charts of a power management method according to one embodiment of the invention. Referring to FIGS. 1, 2 and 4-7, the power management method of the embodiment is suitable for the above fuel cell system 101, and includes the steps of providing the fuel cell system 101 as the above embodiment (Step S401); and detecting whether an amount of an electric-power supplied from the secondary battery 105 to an electronic device 103 reaches to a predetermined value (Step S403).

In the embodiment, when the amount of the electric-power supplied from the secondary battery 105 to the electronic device 103 reaches to the predetermined value, controlling the fuel cartridge 107 to make one of the supply devices 203_1 through 203_6 supplies the second reactant to the corresponding chamber (201_1 through 201_6) so that the second reactant reacts with the first reactant in the corresponding chamber to generate the hydrogen gas (Step S405).

In the other view, when the amount of the electric-power supplied from the secondary battery 105 to the electronic device 103 does not reach to the predetermined value, controlling the secondary battery 105 to continuously supply the electric-power to the electronic device 103 (Step S407). In addition, the embodiment further includes the following steps of:

Detecting the electric-power generated by the fuel cell 109 (Step S501);

Determining a reaction state of the supply device providing the second reactant and the corresponding chamber according to the electric-power generated by the fuel cell 109 (Step S503); and Controlling the fuel cartridge to make another supply device supplies the second reactant to the corresponding chamber so that the second reactant reacts with the first reactant in the corresponding chamber to generate hydrogen gas (Step S505).

In order to use the electric-power generated by the fuel cell 109 effectively, by detecting of the Step S501, since the electric-power generated by the fuel cell 109 is relative to the chemical reaction state of the supply device (203_1 through 203_6) and the corresponding chamber (201_1 through 201_6) thereof, when the electric-power generated by the fuel cell 109 is detected down to a predetermined ratio (for example, down to a certain value between 80%~20% of the original supplied electric-power), the reaction state is determined to react completely.

Moreover, the embodiment further includes the following steps of.

Detecting the reaction state of each of the chambers (201_1 through 201_6) and the corresponding supply device (203_1 through 203_6) thereof (Step S601); and When the reaction state of each of the chambers 201_1 through 201_6 and the corresponding supply devices 203_1 through 203_6 thereof is determined to react completely, setting the electronic device 103 to send out a warning signal (Step S603).

Figure 7:
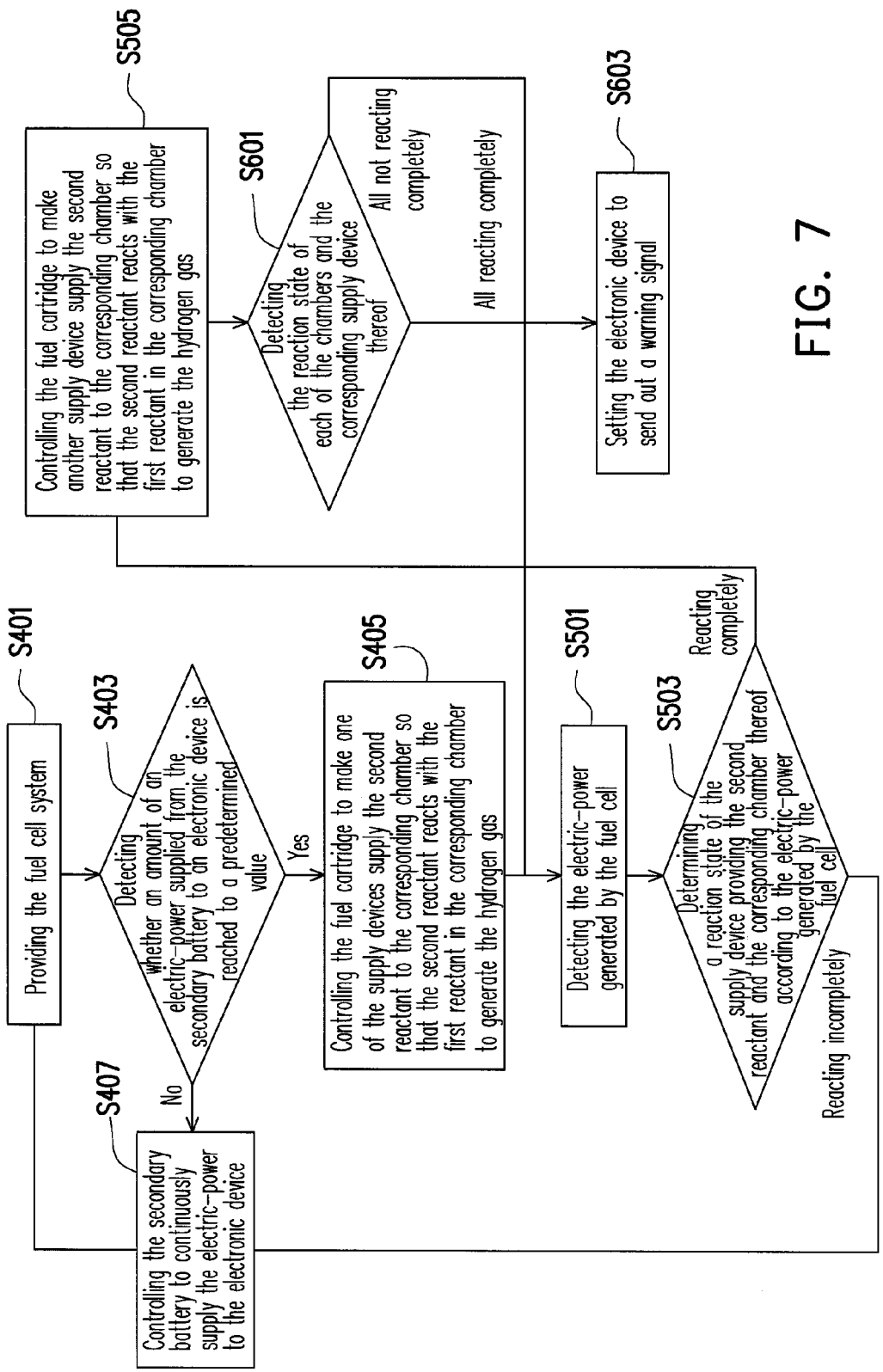

By detecting the reaction state, when the second reactant of each of the supply devices 203_1 through 203_6 in the fuel cartridge 107 reacts with the first reactant of the corresponding chamber (201_1 through 201_6) thereof completely, the electronic device 103 is set to send out the warning signal such as message, the change of light, ... etc., so as to remind user to replace the fuel cartridge 107 or to remind user that the fuel cartridge 107 has reacted completely. Herein, it should be noted that FIG. 7 is a flow chart of the power management method according to one of the embodiments of the invention. In other embodiments of the invention, different power management methods may be achieved by selectively combining with FIGS. 4 through 6, such that the invention is not limited thereto.

In summary, the above embodiments of the invention have at least one of following advantages. Since the fuel cartridge has a plurality of chambers, and when the amount of the electric-power supplied from the secondary battery and provided to the electronic device is down to the predetermined value of N/X watt-hour for example, single chamber is utilized to generate the hydrogen gas for the fuel cell. Accordingly, the hydrogen gas generated by each of the chambers in the fuel cartridge could be utilized fully by the fuel cell.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A fuel cell system, comprising:
   a fuel cartridge, comprising:
      a plurality of chambers, each of the chambers being capable of storing a first reactant; and
      a plurality of supply devices, respectively corresponding to the chambers, and each of the supply devices being capable of supplying a second reactant to the corresponding chamber, so that the second reactant reacts with the first reactant in the corresponding chamber to generate hydrogen gas;
   a fuel cell, coupled to the fuel cartridge, the fuel cell being capable of absorbing the hydrogen gas from the fuel cartridge so as to generate an electric-power; and
   a secondary battery, electrically connected to the fuel cell, the secondary battery being capable of receiving the electric-power for charging,
   wherein the fuel cell is capable of absorbing the hydrogen gas generated from one of the chambers in the fuel cartridge to generate the electric-power,
   wherein the number of the chambers is X; a capacitance of the secondary battery is N watt-hour; and an electric quantity of the electric-power is N/X watt-hour when the fuel cell generates the electric-power by absorbing the hydrogen gas generated from one of the chambers in the fuel cartridge.

2. The fuel cell system according to claim 1, wherein another one of the supply devices supplies the second reactant to the corresponding chamber to make the second reactant react with the first reactant in the corresponding chamber to generate hydrogen gas when the secondary battery consumes N/X watt-hour.

3. The fuel cell system according to claim 1, wherein at least one of the first reactant and the second reactant comprises a chemical hydride.

4. The fuel cell system according to claim 1, wherein at least one of the first reactant and the second reactant comprises a hydrogen-containing compound.

5. The fuel cell system according to claim 4, wherein the hydrogen-containing compound comprises a NaBH4 or a metal hydride.

6. The fuel cell system according to claim 1, wherein each of the supply devices at least comprises a manual switch, a magnetic device, a linkage device or a gear device driven by a motor.

* * * * *